United States Patent
Etzel et al.

(10) Patent No.: US 6,418,224 B1
(45) Date of Patent: Jul. 9, 2002

(54) METHODS AND APPARATUS FOR SELF-INVERTING MULTIPLE-ITERATION CMEA CRYPTO-PROCESSING FOR IMPROVED SECURITY FOR WIRELESS TELEPHONE MESSAGES

(75) Inventors: Mark H. Etzel, Harvard, MA (US); Robert John Frank, Silver Spring, MD (US); Daniel Nelson Heer, Newton, NH (US); Robert Joseph McNelis, Columbia, MD (US); Semyon B. Mizikovsky, Morganville, NJ (US); Robert John Rance, Andover, MA (US); R. Dale Shipp, Columbia, MD (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/073,131

(22) Filed: May 5, 1998

Related U.S. Application Data (60) Provisional application No. 60/045,705, filed on May 6, 1997.

(51) Int. Cl.[7] ................................................. H04M 1/66
(52) U.S. Cl. ...................... 380/247; 380/255; 380/270; 380/274; 380/284; 380/281; 455/410
(58) Field of Search ................................ 380/281, 284, 380/274, 270, 255, 247; 455/411

(56) References Cited

U.S. PATENT DOCUMENTS

| | | | |
|---|---|---|---|
| 5,003,597 A | | 3/1991 | Merkle |
| 5,159,634 A | * | 10/1992 | Reeds, III ..................... 380/42 |
| 5,438,622 A | | 8/1995 | Normile et al. |
| 5,574,788 A | * | 11/1996 | Childress et al. .............. 380/9 |
| 5,594,797 A | | 1/1997 | Alanara et al. |
| 6,075,859 A | * | 6/2000 | Rose ............................. 380/9 |
| 6,081,600 A | * | 6/2000 | Blanchard et al. .......... 380/255 |
| 6,148,405 A | * | 11/2000 | Liao et al. ................... 713/201 |

OTHER PUBLICATIONS

Counterpane Labs. "Flaw in Cell Phone Encryption Identified; Design Process Blamed". pp. 1–3. Mar. 1997.
Wagner et al. "Cryptoanalysis of the Cellular Message Encryption Algorithm". pp. 1–12. Aug. 1997.
Schneier, Bruce. Applied Cryptography: Protocol, Algorithms, and Source Code in C. Oct. 1995. pp. 316–318, 362–363, 366–367.
Schneier, Bruce, "Applied Cryptography: Protocols, Algorithms, and Source Code in C." Oct. 1995. pp. 183, 270–273, 294–295 and 357.

* cited by examiner

*Primary Examiner*—Gilberto Barrón
*Assistant Examiner*—Todd Jack
(74) *Attorney, Agent, or Firm*—Harness, Dickey & Pierce, P.L.C.

(57) ABSTRACT

A self-inverting enhanced CMEA encryption system suitable for use in wireless telephony. An unprocessed text message is introduced into the system and subjected to a first iteration of a CMEA process, using a first CMEA key to produce a first intermediate message, a first intermediate processed text message, a first intermediate ciphertext message or the like. The first intermediate processed text message is subjected to a further iteration of the CMEA process, using a second CMEA key, to produce a second intermediate processed text message. The second intermediate processed text message is subjected to a final iteration of the CMEA process, using the first CMEA key, to produce the final processed text message. Security may be additionally enhanced by subjecting each message to an input/output transformation before and after each iteration of the CMEA process. In a three-iteration process, a total of four input/output transformations are used with the first and fourth input/output transformations being identical, and with the second and third input/output transformations being identical.

10 Claims, 5 Drawing Sheets

METHODS AND APPARATUS FOR SELF-INVERTING MULTIPLE-ITERATION CMEA CRYPTO-PROCESSING FOR IMPROVED SECURITY FOR WIRELESS TELEPHONE MESSAGES

This application claims the benefit of United States Provisional application Ser. No. 60/045,705 filed May 6, 1997.

FIELD OF THE INVENTION

The invention relates generally to wireless telephone cryptography. More particularly, the invention relates to an improved security self-inverting cryptosystem for rapid and secure encryption in a wireless telephone system.

BACKGROUND OF THE INVENTION

Wireless telephony uses messaging for several purposes including, for example, conveying status information, reconfiguring operating modes, handling call termination, and conveying system and user data such as a subscriber's electronic serial number and telephone number, as well as conversations and other data transmitted by the user. Unlike ordinary wire telephony, in which a central serving station is connected to each subscriber by wire, thus ensuring a fair degree of protection from eavesdropping and tampering by an unauthorized party (attacker), wireless telephone serving stations (i.e., base stations) must transmit and receive messages via signals over the air, regardless of the physical location of the subscribers.

Because the base station must be able to send and receive messages to and from a subscriber anywhere, the messaging process is wholly dependent on signals received from and sent to the subscriber equipment. Because the signals are transmitted over the air, they can be intercepted by an eavesdropper or interloper with the right equipment.

If a signal is transmitted by a wireless telephone in plaintext, a danger exists that an eavesdropper will intercept the signal and use it to impersonate a subscriber, or to intercept private data transmitted by the user. Such private data may include the content of conversations. Private data may also include non-voice data transmitted by the user such as, for example, computer data transmitted over a modem connected to the wireless telephone, and may also include bank account or other private user information transmitted typically by means of keypresses. An eavesdropper listening to a conversation or intercepting non-voice data may obtain private information from the user. The message content of an unencrypted telephone signal (i.e., plaintext signal) is relatively easily intercepted by a suitably adapted receiver.

Alternatively, an interloper can interject himself into an established connection by using a greater transmitting power, sending signals to the base station, and impersonating a party to the conversation.

In the absence of applying cryptography to messages being transmitted by wireless signals, unauthorized use of telephone resources, eavesdropping of messages, and impersonation of called or calling parties during a conversation are possible. Such unauthorized interloping and/or eavesdropping has in fact proven to be a grave problem and is highly undesirable.

One cryptographic system for wireless telephony is disclosed in Reeds U.S. Pat. No. 5,159,634 ("Reeds"), incorporated herein by reference. Reeds describes a cryptographic process known as the CMEA ("Cellular Message Encryption Algorithm") process. Central to the operation of the CMEA is the tbox function, which is a one to one mapping of one octet to another, using a known table and a secret key. Beginning with an initial index, key material is combined with table material and the octet to be mapped in multiple iterations to generate the mapping. The tbox function can be implemented either as a function call or as a static memory-resident table. The table's purpose, when implemented as in the latter case, is to allow significant speed-up of encryption for a given security level.

A modification exists which adds security to the CMEA encryption system; this system is disclosed in our patent application Ser. No. 09/059,107, entitled "Methods and Apparatus for Multiple-Iteration CMEA Encryption and Decryption for Improved Security for Cellular Telephone Messages" filed on Apr. 13, 1998, and incorporated herein by reference. However, the encryption system of the aforementioned application is not self-inverting. It is therefore necessary to determine whether a message needs to be encrypted or decrypted. This requirement adds additional complexity to the system.

There exists, therefore, a need in the art for a secure encryption process which can be implemented to operate quickly and efficiently on a small computer such as is commonly used in a mobile wireless transceiver, and which is self-inverting, able to encrypt plaintext or decrypt ciphertext by applying the same steps in the same order.

SUMMARY OF THE INVENTION

According to an aspect of the present invention, an unprocessed text message is introduced. The unprocessed text message is subjected to a first input/output transformation to produce a first transformed message. The first transformed message is subjected to a first iteration of the CMEA process, using a first CMEA key, to produce a first intermediate message, a first intermediate processed text message, a first intermediate ciphertext message or the like. The first intermediate processed text message is subjected to a second input/output transformation to produce a second transformed message. The second transformed message is subjected to a second iteration of the CMEA process, using a second CMEA key, to produce a second intermediate processed text message. The second intermediate processed text message is subjected to a third input/output transformation to produce a third transformed message. The third transformed message is subjected to a third iteration of the CMEA process, using the first CMEA key, to produce a third intermediate processed text message. The third intermediate processed text message is then subjected to a fourth input/output transformation to produce a fourth transformed message, which is the final processed text. According to another aspect of the present invention, the multiple iterations of the CMEA process are performed with keying described as above, but without the input/output transformations preceding and following iterations of the CMEA process.

An apparatus according to the present invention generates text and supplies it to an input/output (I/O) interface which supplies the text to an encryption/decryption processor, which in turn encrypts the text and supplies it to a transceiver for transmission. When the apparatus receives a transmission via the transceiver, the text is supplied to the encryption/decryption processor which decrypts; the text and supplies it to the I/O processor for routing to its destination.

A more complete understanding of the present invention, as well as further features and advantages of the invention, will be apparent from the following Detailed Description and the accompanying drawings.

DETAILED DESCRIPTION

Figure 1:
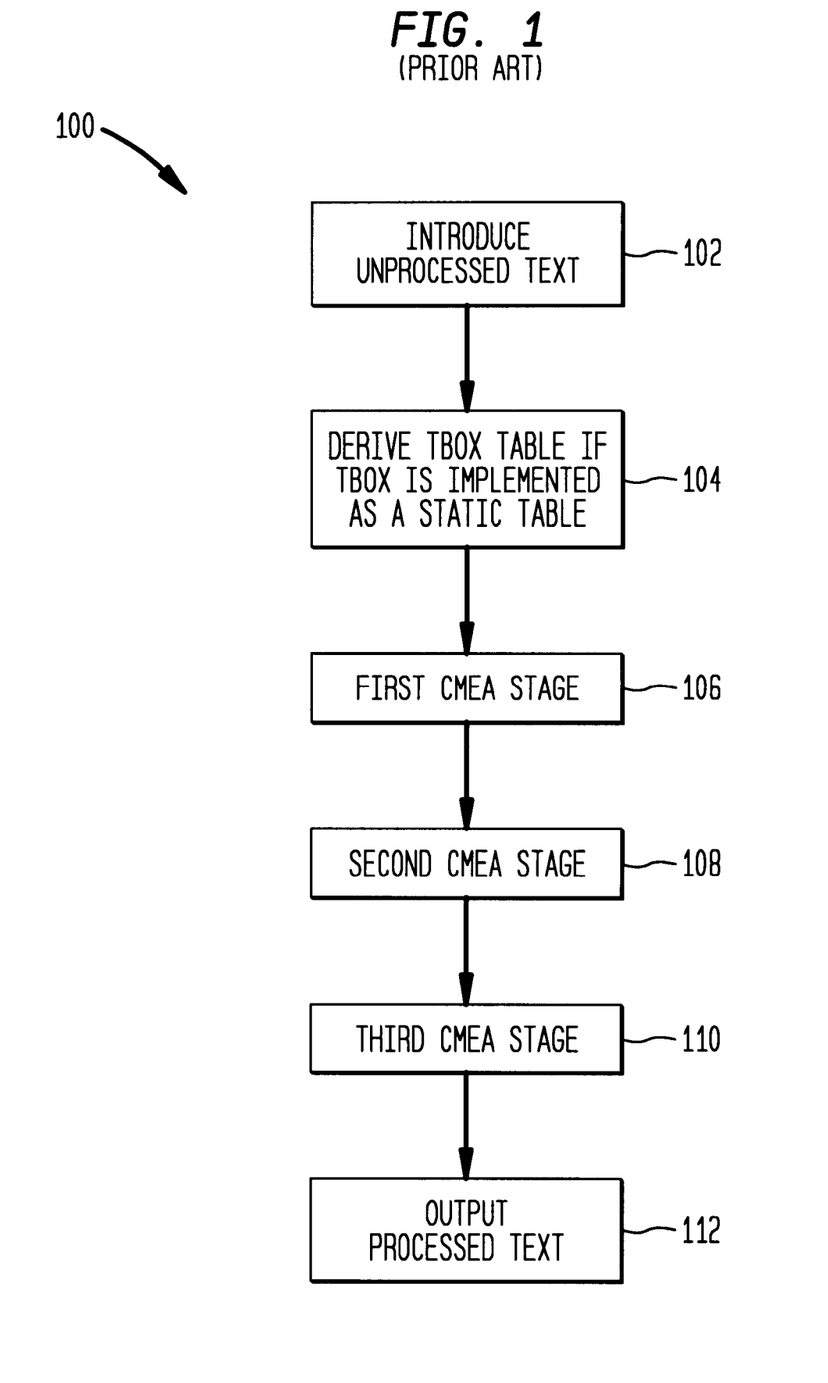
FIG. 1 is a diagram illustrating prior art CMEA key generation and CMEA implementation.

FIG. 1 is a diagram illustrating a prior art method 100 using a CMEA key for encryption of certain critical user data which may be transmitted during a call. The CMEA key is used to create a secret array, tbox(z), of 256 bytes. Alternatively, the tbox may be implemented as a function call. This implementation reduces the use of RAM, but increases processing time by roughly an order of magnitude.

At step 102, unprocessed text is introduced. At step 104, in systems which implement tbox as a static table rather than a function call, the static tbox table is derived. The tbox table is derived as follows. For each z in the range $0 \leq z < 256$, tbox(z)=C(((C(((C(((C((z XOR k)+k1)+z)XOR k2)+k3)+z) XOR k4)+k5)+z)XOR k6)+k7)+z, where "+" denotes modulo 256 addition, "XOR" is the bitwise Boolean Exclusive-Or XOR function, "z" is the function argument, k0, . . . , k7 comprise the eight octets of the CMEA key, and C() is the outcome of a CAVE 8-bit table look-up.

CMEA comprises three successive stages, each of which alters each byte string in the data buffer. At steps 106, 108 and 110, first, second and third stages of the CMEA process are respectively performed, as will be described herein. A data buffer d bytes long, with each byte designated by b(i), for i an integer in the range $0 \leq i < d$, is enciphered in three stages. The first stage (I) of CMEA is as follows:

1. Initialize a variable z to zero,
2. For successive integer values of i in the range $0 \leq i < d$
   a. form a variable q by: q=z $\oplus$ low order byte of i, where $\oplus$ is the bitwise boolean Exclusive-OR operator,
   b. form variable k by: k=TBOX(q),
   c. update b(i) with: b(i)=b(i)+k mod 256, and
   d. update z with: z=b(i)+z mod 256.

The second stage (II) of CMEA is:

1. for all values of i in the range $0 \leq i < (d-1)/2$:b(i)=b(i) $\oplus$(b(d-1-i)OR 1), where OR is the bitwise boolean OR operator.

The final or third stage (III) of CMEA is the decryption that is inverse of the first stage:

1. Initialize a variable z to zero,
2. For successive integer values of i in the range $0 \leq i < d$
   a. form a variable q by: q=z $\oplus$low order byte of i,
   b. form variable k by: k=TBOX(q),
   c. update z with: z=b(i)+z mod 256,
   d. update b(i.) with b(i)=b(i)−k mod 256.

At step 112, the final processed output is provided.

The CMEA process is self-inverting. That is, the same steps applied in the same order are used both to encrypt plaintext and to decrypt ciphertext. Therefore, there is no need to determine whether encryption or decryption is being carried out. Unfortunately, it has been shown that the CMEA process is subject to an attack which will allow recovery of the CMEA key used for a call.

Figure 2:
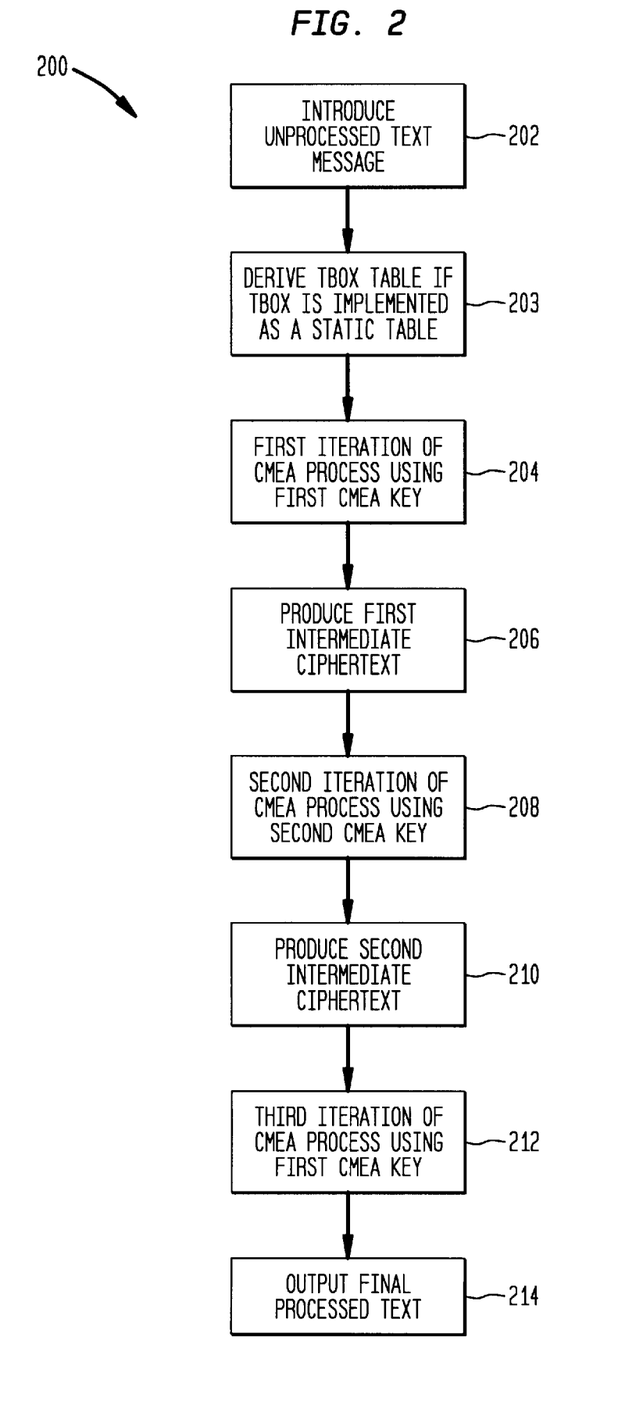
FIG. 2 is a flowchart illustrating a self-inverting enhanced CMEA encryption method employing multiple CMEA iterations.

FIG. 2 illustrates a self inverting method of data crypto-processing according to the present invention. The crypto-processing system preferably includes three iterations of the CMEA process, each iteration employing a first or a second CMEA key. At step 202, an unprocessed text message is introduced. Because the crypto-processing system illustrated in FIG. 2 is self-inverting, the unprocessed message may be either plaintext to be encrypted or ciphertext to be decrypted. There need be no indication of whether an encryption or decryption is to be performed. In step 203, in systems which implement tbox as a static table rather than a function call, the static tbox table is derived as discussed further above. At step 204, the unprocessed text is subjected to a first iteration of the CMEA process, using a first CMEA key, producing a first intermediate ciphertext at step 206. At step 208, the first intermediate text is subjected to a second iteration of the CMEA process, using a second CMEA key and producing a second intermediate ciphertext at step 210. At step 212, the second intermediate text is subjected to a third and final iteration of the CMEA process, using the first CMEA key, and producing an output at step 214.

The CMEA process outlined in the discussion of FIG. 1 is self-inverting. Thus the process illustrated at FIG. 2 is also self-inverting, as it would operate the same way in reverse, with the CMEA process being applied to text with the first, second and first CMEA keys, respectively, being used. Thus, the method of the present invention can be used either to encrypt plaintext or to decrypt ciphertext.

Figure 3:
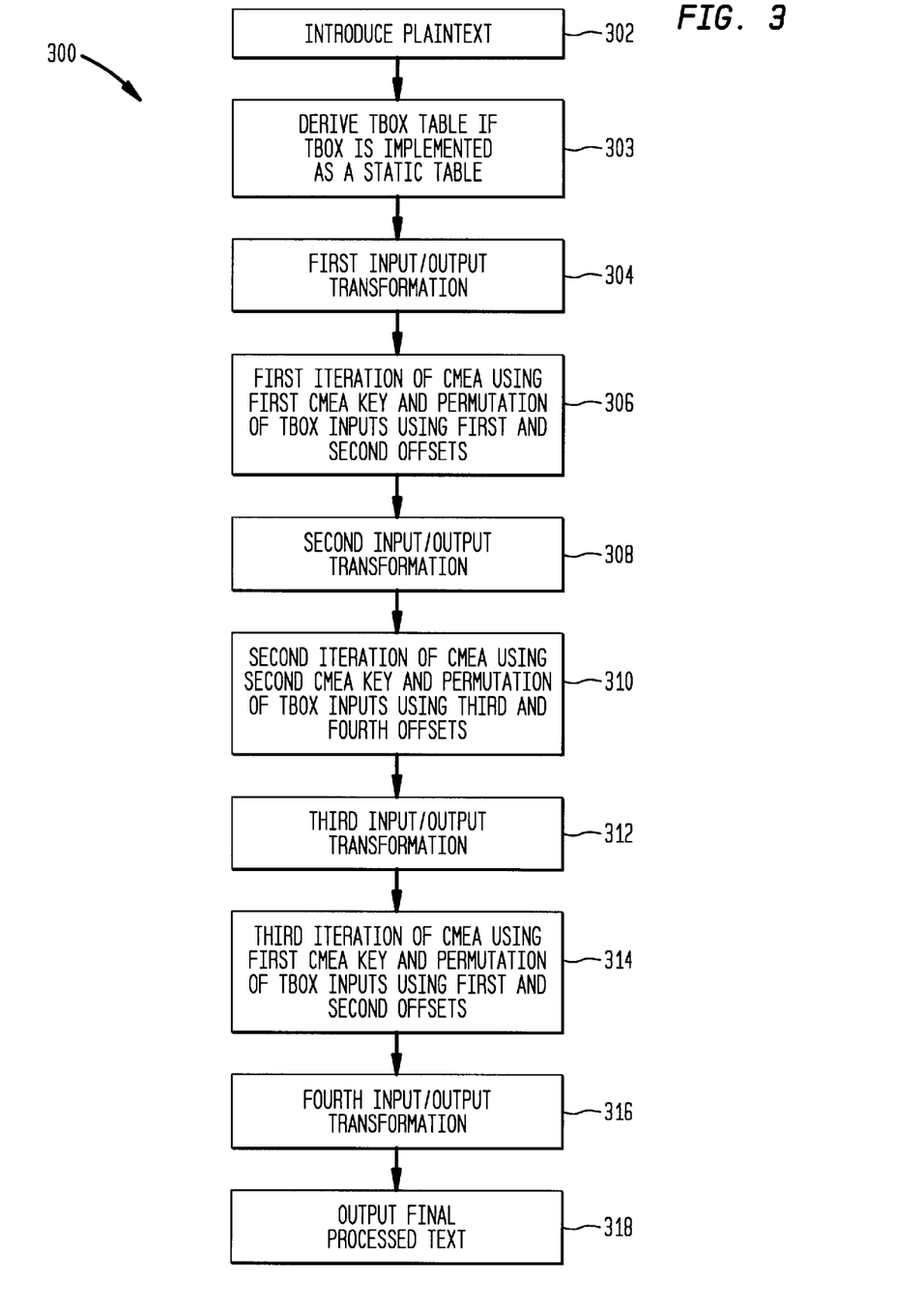
FIG. 3 is a flowchart illustrating a self-inverting enhanced CMEA encryption method employing multiple CMEA iterations preceded and followed by input/output transformations.

FIG. 3 is a flowchart illustrating a method 300 of crypto-processing according to the present invention. The method 300 of crypto-processing illustrated in FIG. 3 includes input/output transformation steps. These input/output transformation steps help to conceal the unprocessed text introduced into the system and the processed text produced by the system, thereby making it more difficult for an attacker to match plaintext and ciphertext and thus increasing the security of the system.

At step 302, an unprocessed text message is introduced into the system. In step 303, in systems which implement tbox as a static table rather than a function call, the static tbox table is derived as discussed above. At step 304, the message is subjected to a first input/output transformation to produce a first transformed message. At step 306, the first transformed message is subjected to a first iteration of the CMEA process, using a first CMEA key, producing a first intermediate ciphertext. Preferably the first iteration of the CMEA process employs an improved use of the tbox function in which each input to the tbox function is subjected to permutation by secret offsets. The improved use of the tbox function is disclosed in our application Ser. No. 09/059,116, entitled "Methods and Apparatus for Enhanced Security Expansion of a Secret Key into a Lookup Table for Improved Security for Wireless Telephone Messages" filed on Apr. 13, 1998, and incorporated herein by reference. The secret offsets used for permutation of the tbox inputs in the first iteration of the CMEA process are preferably the first and second offsets.

As an alternative to the offsets described in our afore-mentioned application Ser. No. 09/059,116, it is possible to use an alternative set of offsets. A set of four offsets may be created using 16-bit secret values $K_1$–$K_8$, with the secret values $K_1$–$K_8$ being created using any of a number of techniques commonly used in the art. The secret values $K_1$–$K_8$ are preferably held constant through a call. For each message n, the offsets are as follows:

$$\text{offset1}_n = ((((2K_1+1)*CS_n))>>8+K_{2a}) \oplus K_{2b} \bmod 256$$

$$\text{offset2}_n = ((((2K_3+1)*CS_n))>>8+K_{4a}) \oplus K_{4b} \bmod 256$$

$$\text{offset3}_n = ((((2K_5+1)*CS_n))>>8+K_{6a}) \oplus K_{6b} \bmod 256$$

$$\text{offset4}_n = ((((2K_7+1)*CS_n))>>8+K_{8a}) \oplus K_{8b} \bmod 256$$

$CS_n$ is 16 bits of cryptosychronizing information, which in some applications may be the first two octets of the (n−1)th ciphertext message, with $CS_0$ being a 16-bit initialization value for the first message of a call. The 16-bit secret value $K_2$ is split into individual bytes $K_{2a}$ and $K_{2b}$, the 16-bit secret value $K_4$ is split into individual bytes $K_{4a}$ and $K_{4b}$, the 16-bit secret value $K_6$ is split into individual bytes $K_{6a}$ and $K_{6b}$, and the 16-bit secret value $K_8$ is split into individual bytes $K_{8a}$ and $K_{8b}$. The splitting of the original 16-bit values into pairs of 8-bit values achieves better use of their bits in the offset calculations, making for improved security.

At step 308, the first intermediate ciphertext is subjected to a second input/output transformation to produce a second transformed message. At step 310, the second transformed message is subjected to a second iteration of the CMEA process, using a second CMEA key. The second iteration of the CMEA process preferably employs an improved use of the tbox function, with tbox input subjected to permutation by secret offsets, as described in our aforementioned application Ser. No. 09/059,116. The secret offsets used for permutation of the tbox inputs in the second iteration of the CMEA process are preferably the third and fourth secret offsets. As an alternative to the third and fourth offsets described in our aforementioned application Ser. No. 09/059,116, the offsets used may be the third and fourth offsets described above in connection with the discussion of step 306. At step 312, the second intermediate ciphertext is subjected to a third input/output transformation to produce a third transformed message. This third input/output transformation is identical to the second input/output transformat. Next, at step 314, the third transformed message is subjected to a third iteration of the CMEA process, using the first CMEA key. The third iteration of the CMEA process preferably employs an improved use of the tbox function, with the tbox inputs subjected to a permutation by secret offsets, as described in our aforementioned application Ser. No. 09/059,116. The offsets used for the permutation of the tbox inputs in the third iteration of the CMEA process are preferably the first and second offsets to ensure that the entire cryptograph system is self-inverting. As an alternative to the first and second offsets described in our aforementioned application Ser. No. 09/059,116, the offsets used may be the first and second offsets described above in connection with the discussion of step 306. At step 316, the third intermediate ciphertext is subjected to a fourth input/output transformation to produce a fourth transformed message. This fourth input/output transformation is identical to the first input/output transformat. Finally, at step 318, processed text is output.

Figure 4:
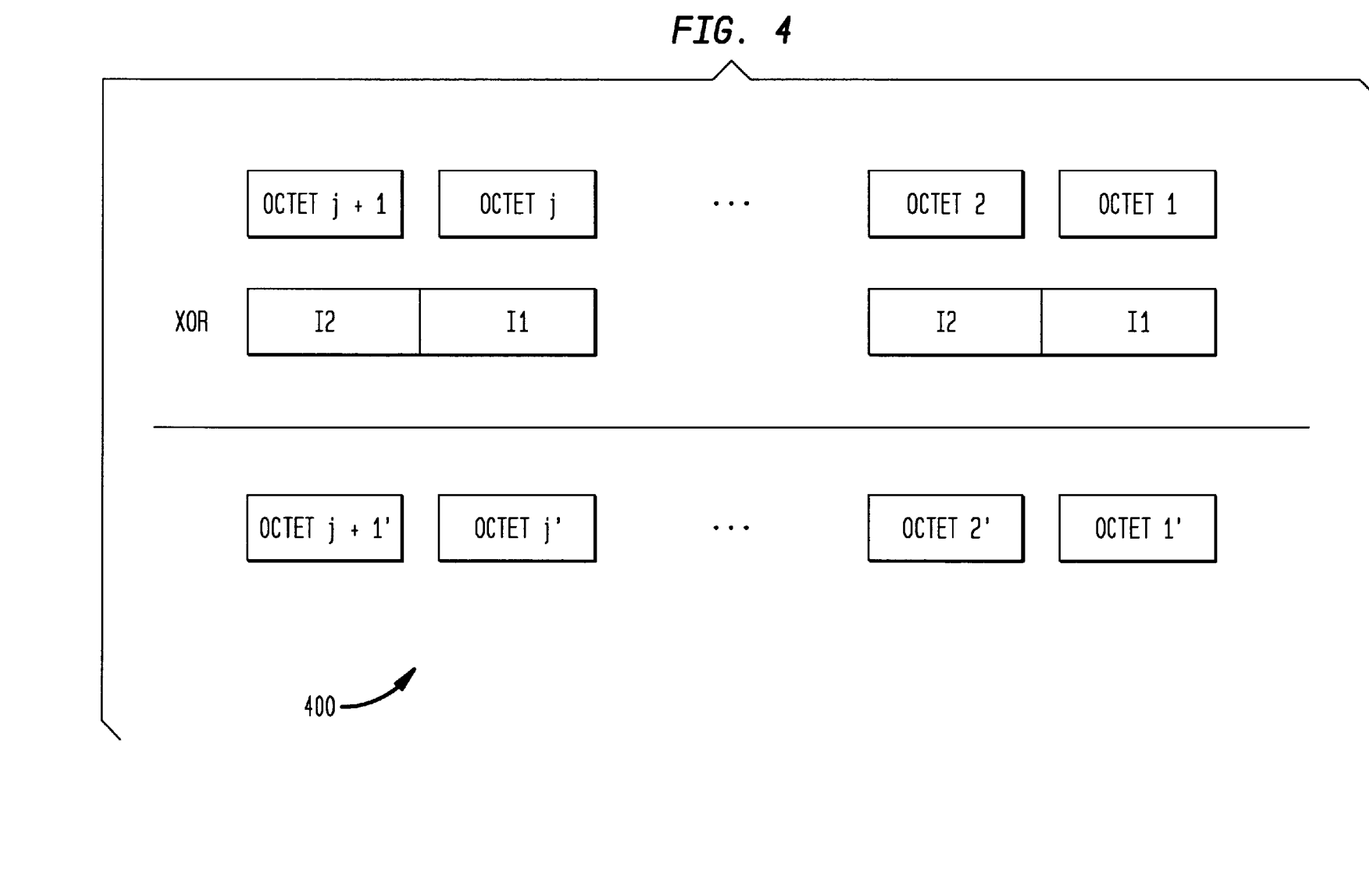
FIG. 4 is a diagram illustrating one particular input/output transformation.

FIG. 4 is a diagram illustrating in detail one possible input/output transformation 400 which may suitably be used in the encryption/decryption process 300 described in connection with FIG. 3. The input/output transformation illustrated in FIG. 4 is also described as an input transformation in our aforementioned application Ser. No. 09/059,107, entitled "Methods and Apparatus for Multiple-Iteration CMEA Encryption and Decryption for Improved Security for Cellular Telephone Messages." Its self-inverting nature makes it suitable for use as an input/output transformation in this context. The input/output transformation 400 is self-inverting. Each of j+1 input data octets, j+1, j, . . . , 2, 1 is XORed with a transformation octet. The transformation octet is a secret value which may be created using any of a number of techniques commonly used in the art. Two transformation octets are preferably used and applied in alternating fashion to the input data octets. Transformation octet $I_2$ is applied to input data octet j+1, transformation octet $I_1$ is applied to input data octet j, transformation octet $I_2$ is applied to input data octet j−1, and so on. The application of the transformation produces a new set of input data octets j+1', j', . . . , 2', 1', which is then used as described above in connection with the discussion of FIG. 3.

Figure 5:
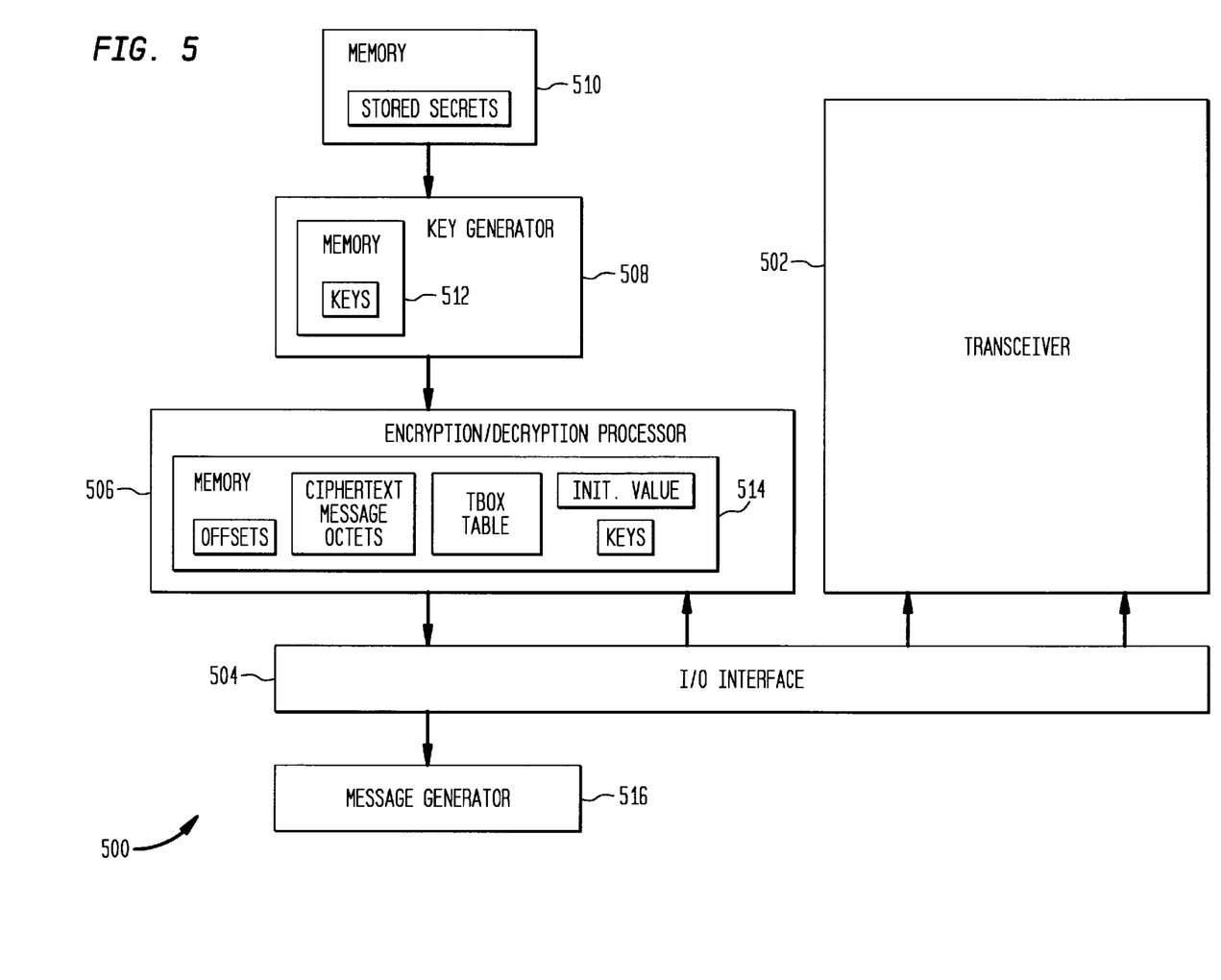
FIG. 5 is a diagram illustrating a telephone system employing self-inverting enhanced CMEA encryption.

FIG. 5 is a diagram showing a wireless telephone set 500 equipped to perform message transmission and encryption/decryption according to the present invention, with facilities for performing the appropriate encryption and decryption. The telephone set 500 includes a transceiver 502, an input/output (I/O) interface 504, an encryption/decryption processor 506, and a key generator 508. The key generator 508 receives and employs stored secret data for key generation. Stored secret data is preferably stored in nonvolatile memory 510 such as an EEPROM or a Flash memory. The key generator 508 stores the generated keys in memory 512. The encryption/decryption processor also includes memory 514 for storage of keys received from the key generator 508, a static tbox table which may be generated and used if it is desired to implement the tbox function as a static table, and other values which may be produced and stored during encryption and decryption. The telephone set 500 also includes a message generator 516, which generates messages to be encrypted by the encryption/decryption processor 506 and transmitted by the transceiver 502.

When an internally generated message is to be encrypted and transmitted by the telephone set 500, the message is transmitted from message generator 512 to the I/O interface 504. The I/O interface 504 identifies the message as an internally generated message to be encrypted and transmits the message to the encryption/decryption processor 506. Because the processing carried out by the encryption/decryption processor is self-inverting, there is no need to identify the message as one to be encrypted. The encryption/decryption processor 506 receives one or more keys from the key generator 508, which it then uses to encrypt the message. Preferably, the encryption decryption processor 506 receives two keys from the key generator 508, which are then employed to perform three-iteration CMEA encryption using input/output transformations as described above in connection with FIG. 3.

First, the unprocessed message is introduced into the system. Next the message is subjected to a first input/output transformation to produce a first transformed message. The first transformed message is subject to a first iteration of the CMEA process, using a first CMEA key, producing a first intermediate ciphertext at step 306. Preferably the first iteration of the CMEA process employs an improved use of the tbox function in which each input to the tbox function is subjected to permutation by secret offsets. The improved use of the tbox function is disclosed in our aforementioned application Ser. No. 09/059,116. The secret offsets used for permutation of the tbox inputs in the first iteration of the CMEA process are preferably the first and second offsets. As an alternative to the offsets described in our aforementioned application Ser. No. 09/059,116, it is possible to use an alternative set of offsets. A set of four offsets may be created using 16-bit secret values $K_1$–$K_8$, with the secret values $K_1$–$K_8$ being created using any of a number of techniques commonly used in the art. For each message n, the offsets are as follows:

$$\text{offset1}_n = ((((2K_1+1)*CS_n))>>8+K_{2a} \oplus K_{2b}) \bmod 256$$

$$\text{offset2}_n = ((((2K_3+1)*CS_n))>>8+K_{4a} \oplus K_{4b}) \bmod 256$$

$$\text{offset3}_n = ((((2K_5+1)*CS_n))>>8+K_{6a} \oplus K_{6b}) \bmod 256$$

$$\text{offset4}_n = ((((2K_7+1)*CS_n))>>8+K_{8a} \oplus K_{6b}) \bmod 256$$

$CS_n$ is 16 bits of cryptosychronizing information, which in some applications may be the first two octets of the (n−1)th ciphertext message, with $CS_0$ being a 16-bit initialization value for the first message of a call. The 16-bit secret value $K_2$ is split into individual bytes $K_{2a}$ and $K_{2b}$, the 16-bit secret value $K_4$ is split into individual bytes $K_{4a}$ and $K_{4b}$, the 16-bit secret value $K_6$ is split into individual bytes $K_{6a}$ and $K_{6b}$, and the 16-bit secret value $K_8$ is split into individual bytes $K_{8a}$ and $K_{8b}$. The splitting of the original 16-bit values into pairs of 8-bit values achieves better use of their bits in the offset calculations, making for improved security.

Next, the first intermediate text is subjected to a second input/output transformation to produce a second transformed message. Next, the second transformed message is subjected to a second iteration of the CMEA process, using a second CMEA key, producing a second intermediate ciphertext. The second iteration of the CMEA process preferably employs an improved use of the tbox function, with tbox inputs subjected to permutation by secret offsets, as described in our aforementioned application Ser. No. 09/059,116. The secret offsets used for permutation of the tbox inputs in the second iteration of the CMEA process are preferably the third and fourth secret offsets. As an alternative to the third and fourth offsets described in our aforementioned application Ser. No. 09/059,116, the offsets used may be the third and fourth offsets described above in connection with the discussion of step 306. Next, the second intermediate text is subjected to a third input/output transformation to produce a third transformed message. This third input/output transformation is identical to the second input/output transformation. Next, the third transformed message is subjected to a third iteration of the CMEA process, using the first CMEA key, to produce a third intermediate ciphertext. The third iteration of the CMEA process preferably employs an improved use of the tbox function, with the tbox inputs subjected to a permutation by secret offsets, as described in our aforementioned application Ser. No. 09/059,116. The offsets used for the permutation of the tbox inputs in the third iteration of the CMEA process are preferably the first and second offsets to ensure that the entire cryptographic system is self-inverting. As an alternative to the first and second offsets described in our aforementioned application Ser. No. 09/059,116, the offsets used may be the first and second offsets described above in connection with the discussion of step 306. Finally, at step 316, the third intermediate text is subjected to a fourth and final input/output transformation identical to the first input/output transformation to produce a fourth transformed message, which is used as the final output message and passed back to the I/O interface 504, which relays it to the transceiver 502 for transmission.

When an encrypted message is received by the telephone set 500, the transceiver 502 passes it to the I/O interface 504. The I/O interface 504 passes the message to the encryption/decryption processor 506. The encryption/decryption processor 506 receives one or more keys from the key generator 508 and decrypts the message. Preferably, the encryption decryption processor 506 receives two keys from the key generator 508, and decrypts the message using a three-iteration CMEA decryption process as described above. Since the three-iteration CMEA process is self-inverting, the steps followed for decryption are identical to those followed for encryption. The encryption/decryption processor passes the decrypted message to the I/O interface 504, where it is then routed for its ultimate use.

The above-described enhancements to the CMEA process, while substantially increasing security, do not substantially increase processing or system resources, and are therefore well suited to use in an environment such as a wireless telephone system, in which units such as the mobile units and system elements often have limited processing power.

While the present invention is disclosed in the context of a presently preferred embodiment, it will be recognized that a wide variety of implementations may be employed by persons of ordinary skill in the art consistent with the above discussion and the claims which follow below.

We claim:

1. A method of crypto-processing of a message, comprising the steps of:
   introducing an unprocessed message;
   performing a first iteration of a CMEA process on the message to produce a first intermediate processed text message, using a first CMEA key;
   performing a second iteration of the CMEA process on the first intermediate processed text message to produce a second intermediate processed text message, using a second CMEA key; and
   performing a third iteration of the CMEA process on the second intermediate ciphertext message to produce a final output, using the first CMEA key.

2. The method of claim 1, wherein one or more input/output transformations are performed on a message or intermediate crypto-processed data before and/or after the message or intermediate crypto-processed data is subjected to an iteration of the CMEA process.

3. The method of claim 2, wherein each message or intermediate crypto-processed data on which an iteration of the CMEA process is performed is subjected to an input/output transformation before the iteration of the CMEA process, and each message produced by the CMEA process is subjected to an input/output transformation after the iteration of the CMEA process.

4. The method of claim 3 wherein each iteration of the CMEA process employs a tbox function with inputs permuted by one or more secret offsets.

5. The method of claim 4 wherein the tbox function inputs are permuted by a first and a second offset during the first iteration of the CMEA process, the tbox function inputs are permuted by a third and a fourth offset during the second iteration of the CMEA process, and the tbox function inputs are permuted by a first and a second offset during the third iteration of the CMEA process.

6. A method of crypto-processing of data comprising the steps of:
   introducing an unprocessed message;
   performing a first input/output transformation on the unprocessed message to produce a first transformed message;
   performing a first iteration of a CMEA process on the first transformed message, using a first CMEA key, to produce a first intermediate ciphertext message;

performing a second input/output transformation on the first intermediate ciphertext message to produce a second transformed message;

performing a second iteration of a CMEA process on the second transformed message, using a second CMEA key, to produce a second intermediate ciphertext message;

performing a third input/output transformation on the second intermediate ciphertext message to produce a third transformed message;

performing a third iteration of a CMEA process on the third transformed message, using the first CMEA key, to produce a third intermediate ciphertext message; and performing a fourth input/output transformation on the third intermediate ciphertext message to produce a fourth transformed message.

7. The method of claim 6 wherein the first transformed message is subjected to a first iteration of the CMEA process which uses a tbox function including permutation of each input to the tbox function by first and second secret offsets, the second input transformed message is subjected to the second iteration of the CMEA process which uses a tbox function including permutation of each input to the tbox function by third and fourth secret offsets, and the third transformed message is subjected to the third iteration of the CMEA process which uses a tbox function including permutation of each input to the tbox function by the first and second secret offsets.

8. The method of claim 7 wherein the first offset for an nth message of a call is expressed by the offset $1_n=((((2K_1+1)*CS_n))>>8+K_{2a})\oplus K_{2b}$ mod 256, where $K_1$ is a 16-bit secret value and $K_{2a}$ and $K_{2b}$ are 8-bit secret values, all constant for the call, and $CS_n$ is 16 bits of cryptosynchronizing information, wherein the second offset for an nth message of a call is expressed by the equation offset $2_n=((((2K_3+1)*CS_n))>>8+K_{4a})\oplus K_{4b}$ mod 256, where $K_3$ is a 16-bit secret value and $K_{4a}$ and $K_{4b}$ are 8-bit secret values, all constant for the call, and $CS_n$ is 16 bits of cryptosynchronizing information, wherein the third offset for an nth message of a call is expressed by the equation offset $3_n=((((2K_5+1)*CS_n))>>8+K_{6a})\oplus K_{6b}$ mod 256, where $K_5$ is a 16-bit secret value and $K_{6a}$ and $K_{6b}$ are 8-bit secret values, all constant for the call, and $CS_n$ is 16 bits of cryptosynchronizing information, and wherein the fourth offset for an nth message of a call is expressed by the equation offset $4_n=((((2K_7+1)*CS_n))>>8+K_{8a})\oplus K_{8b}$ mod 256, where $K_7$ is a 16-bit secret value and $K_{8a}$ and $K_{8b}$ are 8-bit secret values, all constant for the call, and $CS_n$ is 16 bit of cryptosynchronizing information.

9. An encrypting telephone comprising:

a transceiver;

an input/output interface for receiving and routing incoming messages from the transceiver and transmitting outgoing messages to the transceiver;

a message general for receiving user inputs and formatting the user inputs into an outgoing message, the outgoing message being passed to the input/output interface;

memory for storing secret data;

a key generator for receiving secret data from the memory and using the secret data to generate one or more CMEA keys; and an encryption/decryption processor, the encryption decryption processor receiving a message from the input/output interface and first and second encryption keys from the key generator, the encryption/decryption processor being operative to:

perform a first input/output transformation on the message to produce a first transformed message;

perform a first iteration of a CMEA process on the message, using the first CMEA key, to produce a first intermediate message;

perform a second input/output transformation on the first intermediate message to produce a second transformed message;

perform a second iteration of the CMEA process on the second transformed message, using the second CMEA key, to produce a second intermediate message;

perform a third input/output transformation on the second intermediate message to produce a third transformed message;

perform a third iteration of the CMEA process on the third transformed message, using the first encryption key, to produce a third intermediate message;

perform a fourth input/output transformation on the third intermediate message to produce a fourth transformed message; and pass the fourth transformed message as a final output message to the input/output interface for appropriate routing.

10. The encrypting telephone of claim 9 wherein the encryption/decryption processor is further operative so that the first iteration of the CMEA process on the message uses a tbox function including permutation of each input to the tbox function by first and second secret offsets, the second iteration of the CMEA process uses a tbox function including a permutation of each input to the tbox function by third and fourth secret offsets, and the third iteration of the CMEA process uses a tbox function including permutation of each input to the tbox function by the first and second secret offsets.

* * * * *